United States Patent
Mizuno

[15] 3,647,500
[45] Mar. 7, 1972

[54] OIL-FREE SLIDER BEARING MATERIAL AND METHOD OF MAKING THE MATERIAL

[72] Inventor: Koichi Mizuno, Tokyo, Japan

[73] Assignee: Taiho Kogyo Co., Ltd., Toyota, Japana part interest

[22] Filed: Sept. 8, 1969

[21] Appl. No.: 856,003

[30] Foreign Application Priority Data

Apr. 24, 1969 Japan...................................44/31260

[52] U.S. Cl. ..............................117/21, 117/33, 117/132 C, 117/161 R, 117/168, 252/12, 252/12.2
[51] Int. Cl. .....................................B44d 1/094, B44d 1/14
[58] Field of Search.....................117/16, 18, 21, 26, 22, 23, 117/33, 66, 94, 132 C, 161 R, 168; 252/12, 12.2; 308/241

[56] References Cited

UNITED STATES PATENTS

| | | | |
|---|---|---|---|
| 3,416,941 | 12/1968 | Mizuno | 117/26 |
| 3,438,896 | 4/1969 | Council et al. | 252/12 |
| 3,455,864 | 7/1969 | Dodson | 260/41 |
| 3,464,845 | 9/1969 | Osborn et al. | 260/41 |
| 3,471,587 | 10/1969 | Whittemore et al. | 117/132 C |
| 3,508,945 | 4/1970 | Haemer et al. | 252/12.2 |
| 2,689,380 | 9/1954 | Tait | 156/306 |
| 2,813,041 | 11/1957 | Mitchell et al. | 117/21 |
| 2,979,417 | 4/1961 | Kruger et al. | 117/132 C |
| 2,992,137 | 7/1961 | Bunge et al. | 117/33 |
| 3,059,318 | 10/1962 | Herbert et al. | 117/21 |
| 3,139,357 | 6/1964 | Arnold | 252/12.2 |
| 3,194,702 | 7/1965 | Geller et al. | 117/16 |
| 3,238,601 | 3/1966 | White | 161/162 |
| 3,258,319 | 6/1966 | Cox | 117/132 C |
| 3,380,843 | 4/1968 | Davis | 117/18 |
| 3,387,985 | 6/1968 | Huber | 117/21 |

*Primary Examiner*—William D. Martin
*Assistant Examiner*—Raymond M. Speer
*Attorney*—Young & Thompson

[57] ABSTRACT

An oil-free bearing material formed on a substrate metal surface, which consists of a porous resin layer integrally sintered with the metal surface, and wherein the said resin consists essentially of one member selected from the group consisting of polycarbonate, polysulfone, and polyphenylene oxide. The resin layer additionally contains up to 30 weight percent of at least one porosity-improving auxiliary ingredient selected from the group consisting of particles of polytetrafluoroethylene, glass and graphite. The porous resin layer additionally includes mineral wax impregnated therein. A method of making the bearing material comprising the steps of wetting desired portions of the metal surface with a solution of the resin dissolved in a solvent thereof, scattering powder particles of the resin onto said portions of the metal surface thus wet, and sintering the metal surface with the resin powder particles to form a porous resin layer integrally sintered directly on the metal surface.

8 Claims, 4 Drawing Figures

OIL-FREE SLIDER BEARING MATERIAL AND METHOD OF MAKING THE MATERIAL

This invention relates to an oil-free bearing material and a method of making the material, and more particularly to an oil-free slider bearing material which comprises a porous resin layer being integrally sintered with a metal surface and impregnated with mineral wax, and a method therefor.

The method of making the oil-free slider bearing material according to the present invention comprises wetting a metal surface with a solution consisting of a resin and a solvent thereof, said resin being selected from the group consisting of polycarbonate (to be referred to as "PC," hereinafter), polysulfone (to be referred to as "PS," hereinafter), and polyphenylene oxide (to be referred to as "PPO," hereinafter); scattering a powder mixture onto the wetted surface, said powder mixture consisting of particles of a resin selected from the group consisting of PC, PS, and PPO, and one or more optional auxiliary ingredients selected from the group consisting of graphite, polytetrafluoroethylene (to be referred to as "TFE," hereinafter), glass, molybdenum sulfide ($MoS_2$), and tungsten sulfide ($WS_2$); sintering the metal surface with resin particles so as to produce a porous resin layer which is integral with the metal surface; and impregnating the porous resin layer with mineral wax.

The bearing material and the method according to the present invention are novel in three points; namely, (1) a porous sintered resin layer is formed directly on a substrate metal surface by using one or more of three kinds of resins, i.e., PC, PS, and PPO, which are thermoplastic synthetic resins; (2) a solution of the resin in a solvent thereof is used to attach the resin particles onto the metal surface; and (3) the porous sintered resin layer is impregnated with mineral wax. By combining the three novel points, the inventor has succeeded in providing a novel oil-free slider bearing material and a method of making the material.

There are various kinds of slider bearing materials which have a synthetic resin layer attached onto a metal surface. However, there has not been known any bearing material with a sintered resin layer, which is made by attaching resin particles onto a metal surface by using only a solvent of the resin, and heating the metal surface with the resin particles so as to bond the resin particles to the metal surface and weld the individual resin particles with each other by sintering, and also it has not been known to produce a slider bearing material by impregnating such sintered resin layer with mineral wax.

The inventor has found that an excellent oil-free slider bearing material can be achieved by impregnating certain thermoplastic resin, e.g., PC, PS, or PPO, with mineral wax, e.g., paraffin, which resin has outstanding heat resistance, creep resistance, and shock resistance. Based on such findings, the inventor has worked out a method of making the oil-free slider bearing material, which is essentially consisting of forming a porous resin layer on a metal surface, which is integrally sintered with the metal surface, and impregnating the porous resin layer with mineral wax. The bearing material according to the present invention has excellent mechanical strength and rigidity, and obviates shortcomings of thermoplastic synthetic resins, such as a large coefficient of thermal expansion and inability of heat conduction. In other words, the present invention has succeeded in providing a bearing material consisting of a synthetic resin layer, and yet having substantially the same operative properties as those of alloy bearing. Furthermore, the bearing material according to the present invention can be used for producing an oil-free slider bearing of excellent operative characteristics.

Among vast varieties of synthetic resins, thermoplastic resins PC, PS, and PPO are selected in the present invention as the resin material for producing an excellent oil-free slider bearing surface on a metal surface. Here, it should be noted that modified PPO (made by General Electric Co. under Trademark of Noryl) can be used in the bearing material of the present invention, as a kind of PPO. When the aforesaid thermoplastic resin powders are sintered on the metal surface, this sintered layer has the porosity of 0 to 50 percent by volume, and the thermoplastic resin particles are firmly or integrally welded to the metal surface. The porosity of the sintered layer widely varies depending on the grain size of the particles, the heating temperature, and the content of auxiliary ingredients, such as graphite, TFE, $MoS_2$, and $WS_2$.

The auxiliary ingredients in the bearing material of the present invention act to improve the bearing properties and wear resistance of the material. In order to take advantage of such action of the auxiliary ingredients, in the method of the present invention, the use is made of less than 30 percent, based on the total weight of the thermoplastic synthetic resin, of one or more auxiliary ingredients, which are selected from the group consisting of graphite, TFE, glass, $MoS_2$, and $WS_2$. With such auxiliary ingredients, the porosity of the sintered resin layer becomes 1 to 30 percent by volume. By impregnating the sintered resin layer with mineral wax at a rate of 1 to 30 weight percent, based on the total weight of the sintered layer, there is provided the desired oil-free slider bearing material.

The mineral wax usable in the bearing material according to the present invention is, for instance, solid paraffin which is a petroleum wax, microcrystalline wax, ceresin which is a natural petroleum wax, or montan wax which is known as a fossil wax. The mineral wax, such as those listed above, is in solid state at room temperature and has a melting point at 50 to 100° C. Accordingly, the process of impregnating the sintered resin layer with the mineral wax can be carried out either by dipping a metal with the sintered layer into a molten bath of the mineral wax at 70 to 120° C., or by scattering particles of the mineral wax onto the sintered resin layer which is kept at 70 to 100° C. Thus, the mineral wax is absorbed in interstices between adjacent resin particles in the sintered resin layer, so that the sintered resin layer is impregnated with the mineral wax.

In the method according to the present invention, a solution of the aforesaid resin in solvent thereof is applied onto any desired portion of metal surface, all or in part, and then the aforesaid powder mixture of resin particles with optional auxiliary ingredients is scattered onto the wetted portion of the metal surface, so that the powder mixture is selectively attached to the aforesaid desired portion only, because only the desired portion is wetted, while the remainder of the metal surface is kept dry and does not hold particles of the powder mixture. Thus, according to the present invention, the desired sintered layer and accordingly the desired bearing surface can be made at any part of the substrate surface of any configuration, for instance, one or both surfaces of a metal plate, peripheral surface of a shaft, one or both of the inner and outer surfaces of a pipe, and a part or entire surface of a planar or curved surface of articles made by machining, e.g., forging, lathing, and the like. The sintered layer should preferably be 0.2 to 1.0 mm. thick, and the grain size and the composition of the aforesaid powder mixture are selected so as to achieve the aforesaid desired thickness of the sintered layer.

After being impregnated with mineral wax, the sintered resin layer is finished by machining into a thickness of 0.15 to 0.3 mm.

The sintering temperature is preferably 250 to 290° C. for a mixture consisting of PC and auxiliary ingredients, 270 to 330° C. for a mixture consisting of PS and the auxiliary ingredients, and 300 to 350° C. for a mixture consisting of PPO and the auxiliary ingredients. If PPO is used, the sintering operation should preferably be carried out in a hydrogen atmosphere.

Since the sintering temperature is always below 350° C., any metal which does not experience deformation at such sintering temperature can be used as the substrate of the bearing material of the present invention. It is an important feature of the present invention that an oil-free bearing surface can be made with a high dimensional accuracy, because the low sintering temperature eliminates dimensional errors caused in this process. In addition, accurate finishing work can be made on the mineral wax impregnated sintered resin layer by machining.

Typical metal usable as the substrate of the bearing material according to the present invention is steel, cast iron, copper alloy, aluminum alloy, and the like. If the desired surface of the substrate, made of any of the aforesaid metals, is thoroughly cleansed and degreased, the thermoplastic synthetic resin particles, e.g., PC, PS, or PPO, can firmly be welded or sintered to the desired surface by the method according to the present invention. It should be noted that various additional surface treatment can be applied to the substrate, in conjunction with the method of the invention. For instance, the substrate surface can be roughened by a mechanical, physical, chemical, electrical, or metallurgical process. Furthermore, special coating can be made on the substrate surface by applying a chemical conversion treatment or an anodic oxidation treatment thereto.

There are a number of known solvents capable of dissolving PC, PS, and PPO. For instance, PC and PS can easily be dissolved in a halogenated hydrocarbon. Methylene chloride or ethylene chloride is preferably used as a solvent of PC and PS. Trichloroethylene or toluene is preferably used as a solvent of PPO. However, the solvent usable in the method of the present invention for dissolving PC, PS, or PPO is not restricted to the aforesaid preferred agents, but other solvents of the thermoplastic synthetic resin can also be used. For instance, chlorobenzene, dioxane, xylene, or carbon tetrachloride can be utilized as a solvent.

The solution of the synthetic resin in the solvent should have such fluidity and concentration which are suitable for application onto the substrate metal surface. The concentration of the synthetic resin in the most commonly used solution is 20 percent or less. The solution can be applied onto the substrate metal surface by brushing, dipping or spraying, so as to wet the surface. Immediately after the substrate metal surface is wet, synthetic resin powders are scattered on the substrate. After leaving the powders as scattered on the surface for several to twenty seconds, excess resin powders are removed by tilting the metal surface or by blowing off with compressed air. The synthetic resin powder particles thus scattered on the wet surface quickly begin to dissolve in the solvent, so as to become sticky to the substrate metal surface and between adjacent resin particles with each other, so as to form a layer of a certain thickness. The thickness of the synthetic resin layer depends on the amount of the solution wetting the substrate surface, the grain size of the powder particles, and the quantity of the synthetic resin powder being scattered. In general, large particles produce a thin layer, while small particles produce a thick layer due to the high wettability of the solvent. The thickness of the synthetic resin layer, in the state as scattered, is 0.5 to 3.0 mm., and it is reduced to 0.2 to 1.0 mm. upon sintering.

Since the synthetic resin powder particles are attached to the substrate metal surface by means of a solvent so as to form a synthetic resin layer, the resin powders can be applied to the metal surface of any configuration, regardless of whether the surface is vertically directed downwards or intricately curved, and the resin particles thus attached to the metal surface cannot easily be separated therefrom. Furthermore, the resin particles once attached to the metal surface remain as attached to even after the solvent completely evaporates away from the surface, because the resin particles are welded thereto.

The method of applying synthetic resin powders onto the substrate metal surface, according to the present invention, is not restricted to the aforesaid process of prewetting with a solution containing the resin and then scattering the resin powders. For instance, the resin powders can be attached to the substrate metal surface by many other different processes, depending on the area, the curvature, and the material of the substrate surface to be covered; namely, by prewetting the metal surface with a pure solvent of the resin without the resin dissolved therein and then scattering the resin powders onto the prewet surface; by drying desired portions of the substrate surface, wetting the same portions with a solution containing the synthetic resin, and scattering the synthetic resin powders onto the thus wet portions of the surface; or by forming a lining on the desired portion of the substrate surface through prewetting the desired portion with a solution containing the synthetic resin followed by heating the surface at a temperature higher than the melting point of the resin, rewetting the desired portions with a solution containing the resin, and then scattering the resin powders onto the rewetted surface.

The mean grain size of the powder particles of PC, PS, and PPO usable in the method of the invention is in the range of 20 to 200 mesh. The grain size of graphite powder usable in the method according to the present invention is 1 to 50 microns in diameter, while that of TFE particles is preferably 50 to 320 mesh, if used. In other words, the grain size of the aforesaid synthetic resin and graphite to be used in the method according to the present invention are all commercially available.

Glass powders, $MoS_2$ powders, and $WS_2$ powders of commercially available size can be also used in the method of the invention as optional auxiliary ingredients.

The preferable temperature for producing a porous sintered layer is 250 to 290° C. for PC, 270 to 330° C. for PS, and 300 to 350° C. for PPO. In the case of PPO, the heating operation for forming the porous layer is done in a hydrogen atmosphere. If mineral wax powders are scattered onto the porous sintered layer at 70 to 100° C. during the cooling of the sintered layer from the aforesaid sintering temperature, the mineral wax is melted and absorbed by the interstices in the porous sintered layer. It is, of course, possible to impregnate the porous sintered layer, after being cooled to room temperature, with mineral wax by dipping the substrate into a molten bath of the mineral wax.

The porosity of the sintered synthetic resin layer can suitably be controlled in the range of 0 to 50 percent. In an oil-free slider bearing material, according to a preferred embodiment of the invention, the porosity of the sintered resin layer is made 1 to 30 percent, and 1 to 30 Wt. percent of mineral wax, based on the weight of the porous sintered resin layer is impregnated into the resin layer.

In the following description, the amount of mineral wax used in the bearing material will be expressed in terms of "impregnation," which is defined by the following formula.

$$\text{(impregnation)} = \frac{\text{(weight of mineral wax absorbed by the sintered porous resin layer)}}{\text{(weight of the sintered porous resin layer before the impregnating)}} \times 100$$

The "porosity" of the sintered resin layer is defined by the following formula.

$$\text{(porosity)} = \frac{\text{(volume of mineral wax absorbed by the sintered porous resin layer)}}{\text{(volume of the sintered resin layer before the impregnating)}} \times 100$$

The impregnation and the porosity are determined by calculation using the weight, thickness, and area of the sintered resin layer, as well as the specific gravity of the mineral wax. The magnitude of the porosity varies depending on the grain size, the kind, and the amount of the resin powder particles being used, as well as various treating conditions, such as the heating temperature, the kind of solvent used, the concentration of the solvent, the method of applying the solvent, etc. If the aforesaid factors are all kept constant, the porosity can also be kept constant, so that the impregnation of mineral wax can be controlled at the desired value, for instance, in the range of 1 to 30 percent.

The amount of graphite powders and TFE powders to be added in the synthetic resin powders should preferably be less than 30 percent, respectively, and if the content of the graphite powders of TFE powders exceeds 30 percent, the adhesiveness (firmness) of the welded joint between the substrate metal surface and the sintered resin layer is deteriorated. The content of the glass powders should be less than 15 percent, while that of $MoS_2$ and $WS_2$ should preferably be less than 15 percent, respectively.

For a better understanding of the invention, reference is made to the accompanying drawings, in which.

Figure 1:
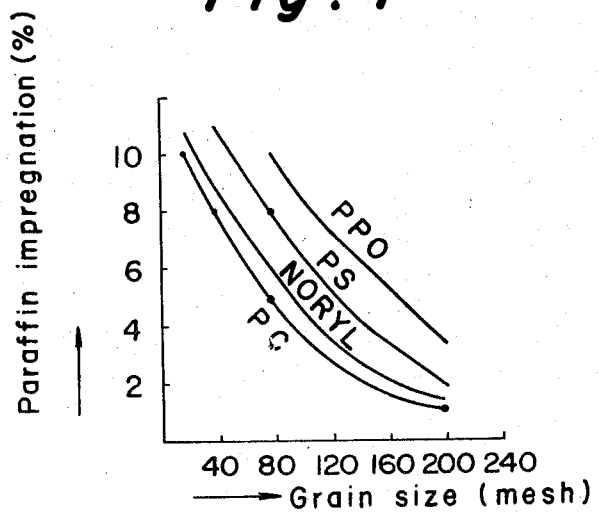
FIG. 1 is a graph illustrating the relation between the grain size of resin particles and paraffin impregnation in a sintered layer made of such resin particles.

In FIG. 1, there is shown the relation between the grain size of synthetic resins PC, PS, PPO and NORYL (a PPO derivative) and paraffin impregnation therein. It is apparent from the figure that the paraffin impregnation increases with the grain size of the resin particles, because the porosity of a sintered resin layer made by the resin particles increases as the grain size of the resin particles increases. For instance, when a sintered resin layer is made by using 20 mesh PC particles, the paraffin impregnation of the sintered resin layer is 10 percent, while when the grain size of resin particles for the sintered synthetic resin layer is reduced to 80 mesh, the paraffin impregnation is also reduced to five percent. If the grain size of the resin particles is further reduced to 200 mesh, the paraffin impregnation diminishes to about one percent. The use of minute resin particles whose grain size is considerably smaller than 200 mesh will result in a dense sintered layer without any interstices therein with a porosity of negligible magnitude. The particles of PS and PPO usually have a melting point higher than that of PC particles, and hence, the porosity of PS and PPO is generally larger than that of PC. As a result, the paraffin impregnation of sintered resin layers made of PS and PPO is generally larger than that of PC layer. It is apparent from FIG. 1 that the preferable grain size of the synthetic resin particles for achieving the desired porosity of the sintered synthetic resin layer should be in the range of 20 to 200 mesh.

Figure 2:
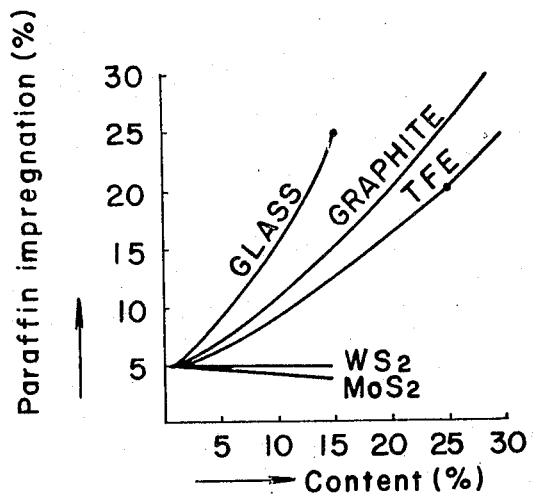
FIG. 2 is a graph illustrating the relation between the content of auxiliary ingredients and paraffin impregnation in the sintered resin layers.

FIG. 2 shows the relation between the content of auxiliary ingredients, such as glass powders, graphite powders, TFE powders, $MoS_2$ powders, and $WS_2$ powders in the sintered resin layer made of 80 mesh PC particles, and paraffin impregnation in the sintered resin layer. The graph clearly shows that the powders of glass, graphite and TFE act to increase the porosity of the sintered resin layer, while the particles of $MoS_2$ and $WS_2$ reduce the porosity. More particularly, a sintered resin layer consisting of PC particles alone has a paraffin impregnation of five percent, while the addition of 25 percent of TFE improves the paraffin impregnation to about 20 percent. The glass is particularly effective in improving the porosity of the sintered resin layer. In fact, the addition of 15 percent of glass powders improves the paraffin impregnation to 25 percent. FIG. 2 also shows that the paraffin impregnation of the sintered resin layer is reduced, although only slightly, by the addition of $MoS_2$ or $WS_2$ in the sintered synthetic resin layer. In short, the use of glass, graphite or TFE, as auxiliary ingredients improves the porosity of the sintered resin layer. Excessive porosity of the sintered resin layer, however, impairs the mechanical strength of the bearing material. Furthermore, the use of such auxiliary ingredients in excess of 30 percent tends to deteriorate the adherence of the sintered resin layer with the substrate metal surface. Therefore, the content of the auxiliary ingredients should be less than 30 percent. The use of $MoS_2$ or $WS_2$ tends to reduce the porosity of the sintered synthetic resin layer, but acts to improve the sliding characteristics of the bearing material by reducing the coefficient of friction thereof. The inventor has found that the use of less than 30 percent of $MoS_2$ or $WS_2$ is effective in improving the sliding characteristics of the bearing material, without causing any adverse effects thereon.

Figure 3:
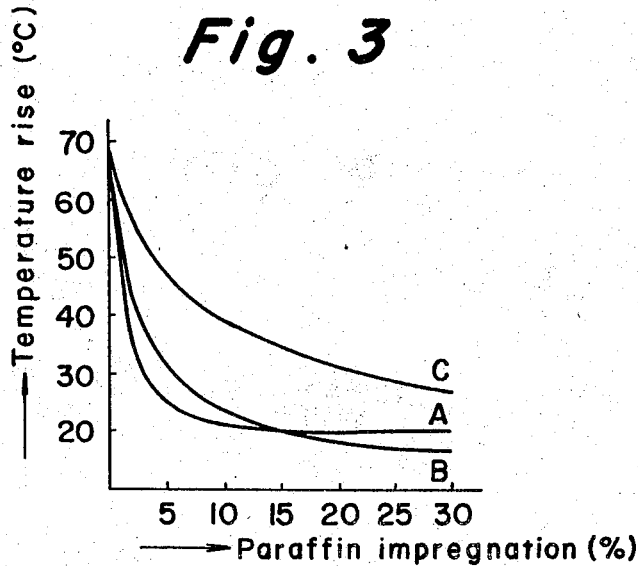
FIG. 3 is a graph showing the relation between frictional temperature rise of bearing material according to the present invention and paraffin impregnation in the bearing material.

FIG. 3 shows the relation between the paraffin impregnation and the frictional temperature rise. The frictional temperature rise was measured by using a wear testing machine, in which test pieces, prepared by providing the bearing material according to the present invention on steel sheets, were subjected to dry friction under the conditions of 20 Kg./cm.$^2$ loading while sliding at a rate of one m./sec. The temperature rise of a bearing surface cooperating with each test piece (as determined by subtracting room temperature from the measured temperature) proved to be reduced as the paraffin impregnation increased. In other words, as the paraffin impregnation increases, the heat quantity generated by friction is reduced. In the case of test pieces A (with a sintered resin layer consisting of 75 percent PC, 20 percent TFE, and five percent $WS_2$) and B (with a sintered resin layer consisting of 80 percent PS, 17 percent TFE, and three percent graphite), the temperature rise decreases as the paraffin impregnation in the sintered resin layer increases, until the paraffin impregnation becomes 10 percent, and the temperature rise becomes substantially constant for paraffin impregnation larger than 10 percent. In the case of the test piece C (with a sintered resin layer consisting of 90 percent PPO, five percent glass, and five percent graphite), the temperature rise is comparatively high due to the existence to the glass particles, but the actual values of the temperature rise decrease as the paraffin impregnation increases.

As can be seen from the curves of the test pieces A, B, and C in FIG. 3, even a very small paraffin impregnation reduces the temperature rise to a great extent. In fact, the test piece A with no paraffin impregnation has temperature rise of 65° C., while the use of only 2.5 percent paraffin impregnation results in a drastic reduction of the temperature rise, i.e., from 65 to 30° C. Thus, the paraffin impregnation has outstanding effects on the improvement of bearing material. According to the present invention, there is provided bearing material which contains 1 to 30 percent of paraffin impregnated therein. As pointed out in the foregoing, the use of paraffin in excess of 30 percent requires a porosity of the sintered resin layer, which is larger than 30 percent, and such large porosity impairs the mechanical strength of the bearing material. Accordingly, the paraffin impregnation in the bearing material of the invention is limited to 30 percent or less.

Figure 4:
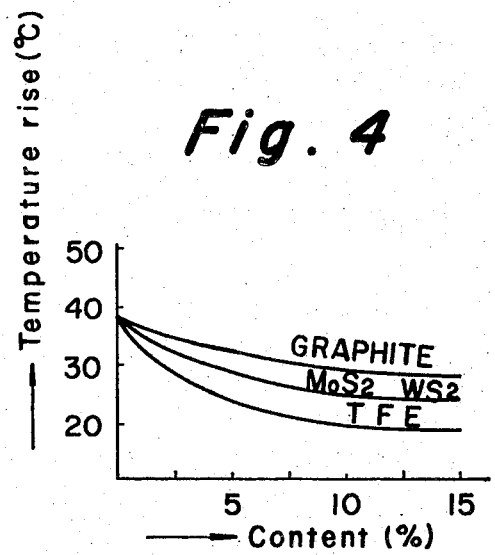
FIG. 4 is a graph showing the relation between frictional temperature rise of bearing material according to the present invention and content of auxiliary ingredients therein.

FIG. 4 illustrates the relation of the content of graphite, TFE, $MoS_2$, and $WS_2$ in paraffin wax, which is to be impregnated into a sintered resin layer made of 40 mesh PC particles (with a porosity of about eight percent, as seen from FIG. 1), and the frictional temperature rise of the bearing material with such paraffin impregnation. It is apparent from the figure that the addition of graphite, TFE, $MoS_2$, and $WS_2$ in the paraffin, which is to be impregnated in the sintered resin layer, also improves the sliding characteristics of the bearing material. Among such auxiliary additives to paraffin, TFE powders are particularly effective. In fact, the frictional temperature rise of the bearing material which is impregnated with paraffin alone is 38° C., as determined by the aforesaid method, while the addition of 10 percent TFE reduces the temperature rise to 20° C. Similar improvement can be achieved by the addition of graphite, $MoS_2$, or $WS_2$ powders.

Thus, the inventor has found that a bearing material of the invention, which consists of a sturdy sintered resin layer made on a substrate metal surface with PC, PS, or PPO powders alone and paraffin impregnation containing the aforesaid additive and being impregnated in the sintered resin layer, has both the improved wear resistance and the improved sliding characteristics. In other words, it is one of the important features of the invention to use paraffin, which contains one or more minute particles (with a mean diameter preferably smaller than 10 microns) of graphite, TFE, $MoS_2$, and $WS_2$, for the purpose of impregnating the sintered resin layer on the substrate metal surface to make the desired slider bearing material. The content of graphite, TFE, $MoS_2$, or $WS_2$ minute powders in paraffin is limited to 15 percent, in the present invention. When more than 15 percent of such minute powder particles is added, the minute particles are filtered in the interstices of the sintered resin layer, and the particles thus added are not distributed homogeneously.

In the test pieces, which were used in the measurements related to FIGS. 1 to 4, paraffin was used as mineral wax to impregnate the sintered resin layer. The mineral wax of the present invention is, however, not restricted to such paraffin alone, but any suitable mineral wax can be used. For instance, microcrystalline wax, ceresin wax, montan wax, and other waxes can similarly be used for achieving the same functions and effects. Especially, the ceresin wax produces better results than paraffin.

The mineral wax to be used in the bearing material according to the present invention should have a melting point at 50 to 100° C. Two or more mineral waxes can be used in the bearing material of the invention at any desired ratio to achieve the same effects as those provided by a single kind of mineral wax. For instance, a mixture consisting of 50 percent paraffin and 50 percent ceresin wax can be used in an embodiment of the present invention.

Therefore, in a preferred embodiment of the present invention, porous sintered resin layer is formed by using 20 to 200 mesh synthetic resin powders consisting of PC, PS, or PPO, and less than 30 percent, based on the weight of the resin layer, of auxiliary ingredient powders consisting one or more of graphite, TFE, glass, $MoS_2$, and $WS_2$, and the porous sintered resin layer is impregnated with 1 to 30 percent, based on the weight of the resin layer, of mineral wax, which mineral wax may contain less than 15 percent, based on the weight of the resin layer, of one or more of minute particles of graphite, TFE, $MoS_2$, and $WS_2$. Operative characteristics of the oil-free slider bearing material according to the present invention, may be controlled in a wide range, by adjusting the concentration of the aforesaid different ingredients with the above limitations, as well as various other factors, such as the kind and concentration of the solvent for dissolving the synthetic resin powders, the sintering temperature of the resin powders, the heating temperature of the wax, etc.

As described in the foregoing, according to the present invention, there is provided a method for making an oil-free slider bearing material on a substrate metal surface, independent of the material, size and configuration of the substrate, which comprises applying a layer of resin powder consisting of PC, PS, or PPO and optional auxiliary ingredients of graphite, TFE and the like, sintering the layer of resin powder so as to form a sintered layer, and impregnating the sintered resin layer with mineral wax, such as paraffin. It is possible to apply machine work on the sintered resin layer formed on steel sheet, according to the present invention, such as by rolling into a certain thickness, by cutting into a desired size, or by bending or by pressing into a desired configuration. By impregnating the thus machined sintered resin layer with a suitable mineral wax, there is provided rolled bushes, thrust washers, and other special slider bearing surface of intricate shape. Similarly, by forming a sintered resin layer on a desired portion of the peripheral surface of a shaft, such as a steel shaft, a cast iron shaft, or a stainless steel shaft, and by suitably machining the sintered resin layer and impregnating the sintered resin layer with proper mineral wax, there is provided a rotary shaft which need not any conventional complicated shaft bearing.

Furthermore, the bearing surface according to the present invention shows excellent performance characteristics without necessitating any oiling. It is one of the important features of the present invention that a substrate metal surface is lined with a wax-impregnated resin layer, so as to eliminate the aforesaid shortcomings of conventional bearing materials, such as excessively large thermal expansion and low heat conductivity. In other words, the present invention provides oil-free slider bearing material which is usable as an outstanding industrial machine element, and thus contributes greatly to the industry.

The invention will now be described in further detail, referring to examples.

Example 1

Oil-free slider bearing material was lined on one side of a continuous steel belt. A 1.0 mm.-thick and 130 mm.-wide continuous steel strip was degreased and pickled. A liquid mixture consisting of 15 percent of PC and 85 percent of a solvent, which was comprised of methylene chloride and dioxane, was applied onto one side of the steel strip by spraying. The strip thus wet by the liquid mixture was passed through slit while scattering, just prior to entering the slit, a powder mixture by a hopper disposed above the steel strip. The powders were consisting of 86 percent of 150 mesh PC, 10 percent of 100 mesh TFE, two percent of 100 mesh graphite, and two percent of 100 mesh glass.

Immediately after the passing through the slit, excess powders on the steel strip were removed by directing compressed air thereto from an air compressor. A sintered resin layer was formed by heating the strip at 270° C. while passing through a furnace, and after cooling to 70–80° C. in the open air, paraffin powders were scattered onto the sintered resin layer.

Thus, a 0.4 mm.-thick sintered layer of a bearing material was achieved. The sintered layer thus formed was continuously machined by a miller to reduce the thickness of the sintered layer to 0.25 mm. As a result, there was provided a steel strip coated with a sliding material, whose overall thickness was 1.25 mm.

The bearing material thus formed on the steel strip showed excellent adherence to the steel strip, as well as considerably improved thermal expansion and heat conductivity.

Example 2

A lining consisting of bearing material of the invention, using PPO powder, was formed on a part of the stainless slider of a food processing machine.

The slider weighed 1.205 grams before treating for applying the lining. That portion of the slider, which was to be lined, was degreased and polished by an abrasive paper. A trichloroethylene solution containing 10 percent of PPO dissolved therein was brushed onto the thus cleansed portion of the slider, and a thin film was formed on the slider by heating it at 320° C. in a hydrogen atmosphere. The same trichloroethylene solution was again brushed onto the thin film to wet there, and 120 mesh PPO powders were scattered on the wet surface of the slider. The slider was heated at 330° C. in a hydrogen atmosphere to form a 0.35 mm.-thick sintered resin layer. The slider with the sintered resin layer weighed 1,218 grams. In other words, the sintered layer weighed 13 grams.

The sintered resin layer was then impregnated with ceresin powders containing five percent of graphite, by scattering the powders on the sintered resin layer while heating the layer at 80 to 100° C. The amount of the ceresin powders with five percent of graphite, which was absorbed by or impregnated in the sintered resin layer, was 2.1 grams. In other words, the content of mineral wax, inclusive of graphite, in the bearing material lined on the stainless slider was about 16 percent (100×2.1/13). The thickness of the bearing material layer was reduced to 0.2 mm. by machining.

The slider thus lined with the bearing material of the invention proved to have outstanding performance characteristics.

Example 3

Peripheral surface of a rotary shaft made of cast iron was partially lined with the bearing material consisting of mineral wax impregnated resin layer.

Those portions of the shaft which were to be lined were so machined as to have a 25.60 mm. dia., and degreased and cleansed. The shaft thus machined and cleansed weighed 826 grams.

A methylene chloride solution containing 10 percent of PS was applied onto the thus cleansed surface, and dried by leaving it for a while. A liquid solution consisting of methylene chloride and monochlorobenzene was applied onto the desired portion of the dried surface to wet there. Immediately after the wetting, a powder mixture was scattered on the wet portion of the shaft surface, and the excess powder on the wet surface was removed by tilting the shaft. The powder mixture was consisting of 91 percent of 30 mesh PS, five percent of 200 mesh TFE, and four percent of 200 mesh glass.

The shaft covered by the resin powder layer was heated at 290° C., until the resin was properly sintered. After being cooled, the shaft with the sintered resin layer was weighed and found to be 831.5 grams. In other words, the sintered resin layer weighed 5.5 grams.

The shaft was then dipped into a molten bath of microcrystalline wax at 90° C. for impregnating the sintered resin layer with the microcrystalline wax. By suitably weighing, it was found that 1.1 grams of the wax was absorbed by the sintered resin layer. In other words, the content of the wax in the bearing material was about 20 percent (100×1.1/5.5). The lined portion of the shaft was then machined into 26.00 mm. dia., or 0.20 mm. in the thickness of the bearing material.

The shaft thus lined with the bearing material of the invention proved to have excellent performance characteristics.

Example 4

The inner surface of an aluminum bronze alloy bush was lined with the bearing material of the invention.

The surface, which was to be lined, was cleansed and wet by dipping into a solution of methylene chloride containing 15 percent of PC. A powder mixture was scattered on the surface thus wet, which consisted of 85 percent of PC and 15 percent of graphite. By heating at 280° C., a sintered resin layer was formed on the inner surface of the bush. After being cooled, the bush was then dipped in a molten bath of paraffin containing 10 percent of TFE, so as to be impregnated with the paraffin. The bearing material thus formed on the inner surface of the bush contained 15 percent of the paraffin with TFE.

The inner surface of the bush with the aforesaid lining was machined and finished into the desired dimension. The lining on the inner surface of the bush proved to be an excellent oil-free slider bearing member.

Example 5

A sliding guide surface was formed by depositing the bearing material of the invention on one side of a 9.80 mm.-thick 100 mm.-wide and 400 mm.-long aluminum alloy sheet, which weighed 1,162 grams. The bearing material thus deposited, of course, comprised a sintered resin layer impregnated with mineral wax, or paraffin in this Example.

After being degreased and pickled, the aluminum alloy sheet was wet by dipping into a liquid mixture, which consisted of 15 percent of PC and the remainder of methylene chloride and ethylene chloride. Immediately after the wetting, a powder mixture was scattered on the wet surface, and the excess was removed by tilting the sheet. The powder mixture consisted of 75 percent of PC, 23 percent of TFE, and two percent of $WS_2$. A sintered resin layer was formed by heating the sheet with the resin powder in a furnace at 290° C. for about 40 minutes.

The sheet after the heating weighed 1,182 grams, or the sintered resin layer weighed 20 grams. The sheet was then dipped into a molten bath of paraffin at 70° C., to impregnate the sintered resin layer with the paraffin. Immediately after the sheet was taken out of the molten paraffin bath, excess paraffin was removed by wiping with a cloth. After being cooled, the sheet with the paraffin impregnated resin layer was weighed, and it was found that the amount of paraffin absorbed in the sintered resin layer was 4.0 grams. Thus, the content of paraffin in the final bearing material layer was about 20 percent (100×4.0/20.0). The thickness of the sintered resin layer was about 0.6 mm. before the impregnation, but the finished sheet with the bearing material of the invention was machined to a thickness of 10.0 mm. In other words, the thickness of the bearing material layer of the invention on the finished sheet was 0.2 mm.

Although the present invention has been described while referring to preferred embodiments, it should be understood that numerous changes and modifications are possible without departing from the scope of the invention, as will be claimed hereinafter.

What is claimed is:

1. In an oil-free bearing, comprising a substrate metal surface and a bearing resin layer formed on the metal surface and consisting essentially of at least one member selected from the group consisting of polycarbonate, polysulfone, and polyphenylene oxide; the improvement in which the bearing resin layer is a porous resin layer directly sintered on the metal surface.

2. An oil-free bearing according to claim 1, additionally including a mineral wax impregnated in the porous resin layer.

3. An oil-free bearing according to claim 2, in which said mineral wax is at least one member selected from the group consisting of solid paraffin, microcrystalline wax, ceresin, and montan wax.

4. An oil-free bearing according to claim 1, in which said resin layer contains up to 30 weight percent of at least one porosity-improving auxiliary ingredient selected from the group consisting of particles of polytetrafluoroethylene, glass and graphite.

5. In a method of making an oil-free bearing having a substrate metal surface and a bearing resin layer formed on the metal surface and consisting essentially of at least one member selected from the group consisting of polycarbonate, polysulfone, and polyphenylene oxide; the improvement comprising applying the resin layer to the metal surface by wetting desired portions of the metal surface with a solution of the resin dissolved in a solvent thereof, scattering powder particles of the resin onto said portions of the metal surface thus wet, so as to cause said resin powder particles to adhere to said metal surface uniformly, and sintering the metal surface with the resin powder particles to form a porous resin layer integrally sintered directly on the metal surface.

6. A method of making an oil-free bearing according to claim 5, including in addition, the step of impregnating a mineral wax in the porous resin layer.

7. A method of making an oil-free bearing according to claim 6, in which the mineral wax is at least one member selected from the group consisting of solid paraffin, microcrystalline wax, ceresin, and montan wax.

8. A method of making an oil-free bearing according to claim 5, including in addition, the step of adding up to 30 weight percent of a porosity-improving auxiliary ingredient to the resin powder particles before the step of scattering, which auxiliary ingredient is at least one member selected from the group consisting of polytetrafluoroethylene, glass and graphite.

* * * * *